United States Patent
Ahmed

(10) Patent No.: US 12,337,665 B2
(45) Date of Patent: Jun. 24, 2025

(54) VEHICLE DOOR SEAL ASSEMBLY

(71) Applicant: NISSAN NORTH AMERICA, INC., Franklin, TN (US)

(72) Inventor: Mahiuddin Ahmed, Troy, MI (US)

(73) Assignee: NISSAN NORTH AMERICA, INC., Franklin, TN (US)

(*) Notice: Subject to any disclaimer, the term of this patent is extended or adjusted under 35 U.S.C. 154(b) by 0 days.

(21) Appl. No.: 18/478,903

(22) Filed: Sep. 29, 2023

(65) Prior Publication Data
US 2025/0108680 A1 Apr. 3, 2025

(51) Int. Cl.
*B60J 5/04* (2006.01)
*B60J 10/242* (2016.01)
*B60J 10/84* (2016.01)
*B60J 10/86* (2016.01)

(52) U.S. Cl.
CPC ............ *B60J 10/84* (2016.02); *B60J 10/242* (2016.02); *B60J 10/86* (2016.02)

(58) Field of Classification Search
CPC ........... B60J 10/84; B60J 10/242; B60J 10/86
USPC ................................................ 296/199, 209
See application file for complete search history.

(56) References Cited

U.S. PATENT DOCUMENTS

| | | | | |
|---|---|---|---|---|
| 3,622,195 A | * | 11/1971 | Lautenbach | B62D 25/025 296/35.1 |
| 5,094,504 A | * | 3/1992 | Wurl | B62D 29/008 296/202 |
| 5,820,191 A | | 10/1998 | Blakewood, Jr. et al. | |
| 6,193,306 B1 | * | 2/2001 | Lee | B62D 25/025 296/205 |
| 8,783,750 B2 | * | 7/2014 | Kuwabara | B60R 13/043 49/490.1 |
| 9,168,813 B2 | * | 10/2015 | Kasuya | B60J 10/86 |
| 9,421,852 B2 | * | 8/2016 | Ryu | B60J 10/86 |
| 9,855,900 B2 | * | 1/2018 | Plaum | B60J 5/0413 |
| 10,457,224 B2 | * | 10/2019 | Katayama | B60R 13/04 |
| 11,427,066 B1 | * | 8/2022 | Hirano | B60J 5/0415 |
| 2004/0137197 A1 | * | 7/2004 | Watanabe | B60J 10/84 428/122 |

(Continued)

FOREIGN PATENT DOCUMENTS

| | | | | |
|---|---|---|---|---|
| CN | 101323241 A | * | 12/2008 | ............ B60J 10/24 |
| DE | 3921381 A1 | | 1/1991 | |

(Continued)

*Primary Examiner* — Jerry E Redman
(74) *Attorney, Agent, or Firm* — Global IP Counselors, LLP

(57) ABSTRACT

A vehicle body structure has surfaces that define a door opening and a door. A first seal is attached to the surfaces that define the door opening surrounding the door opening. A second seal is attached to a peripheral surface of the door such that with the door in a closed orientation, the second seal contacts areas of the surfaces that define the door opening. The peripheral surfaces of the door between the first seal and the second seal, the first seal and the second seal define a space therebetween. A vent member is installed on a section of the first seal compressing that section of the first seal such that the vent member and an adjacent section of the door define a vent gap therebetween thereby allowing escape of air trapped and compressed within the space during movement of the door to the closed orientation.

20 Claims, 8 Drawing Sheets

(56) References Cited

U.S. PATENT DOCUMENTS

| | | | |
|---|---|---|---|
| 2009/0167010 A1* | 7/2009 | Rompage | B60R 13/06 280/847 |
| 2010/0038931 A1* | 2/2010 | Ihashi | E05F 5/003 296/146.9 |
| 2011/0012388 A1* | 1/2011 | Iida | B60J 10/87 296/146.9 |
| 2013/0069396 A1* | 3/2013 | Atkinson | B60R 13/04 296/209 |
| 2013/0187411 A1* | 7/2013 | Kuwabara | B60J 10/84 296/199 |
| 2014/0049067 A1* | 2/2014 | Kasuya | B60J 10/25 49/476.1 |
| 2015/0231954 A1* | 8/2015 | Ryu | B60R 13/043 49/469 |
| 2018/0086188 A1* | 3/2018 | Tamao | B60J 5/0418 |

FOREIGN PATENT DOCUMENTS

| | | | | |
|---|---|---|---|---|
| DE | 102008028004 A1 | 1/2009 | | |
| JP | 2002154332 A | 5/2002 | | |
| JP | 2002154337 A | 5/2002 | | |
| JP | 2006123582 A | 5/2006 | | |
| WO | WO-2013175812 A1 * | 11/2013 | | B60J 10/84 |

* cited by examiner

VEHICLE DOOR SEAL ASSEMBLY

BACKGROUND

Technical Field

The present disclosure generally relates to a vehicle door seal assembly. More specifically, the present disclosure relates to a vehicle door seal assembly where a door opening seal and a door seal create an enclosed space therebetween with the door in the closed orientation, with a vent member compressing a portion of the door opening seal thereby providing venting of air trapped within the enclosed space.

Background Information

Typically, modern vehicles have a door opening seal installed around the outer periphery of a door opening. A door seal is typically installed to a door of the vehicle such that an enclosed space is defined between the door opening seal, peripheral surfaces of the door, peripheral surfaces of the door and the door seal. Upon closing the door to cover the door opening, air is trapped and compressed in the enclosed space as the door is moved to a closed orientation making it difficult to close the door.

SUMMARY

One object of the present disclosure is to provide a vehicle door, a corresponding door opening of the vehicle and corresponding seals with a member that provides a vent to an enclosed space between the door, the door opening and the seals.

In view of the state of the known technology, one aspect of the present disclosure is to provide a vehicle door seal assembly with a vehicle body structure, a first seal, a door, a second seal and a vent member. The vehicle body structure has surfaces that define a door opening. The first seal is attached to inboard areas of the surfaces such that the first seal surrounds the door opening. The door is attached to the vehicle body structure for pivotal movement between a closed orientation covering the door opening and an open orientation exposing the door opening. The door has peripheral surfaces that surround the door. The second seal is attached to areas of the peripheral surfaces of the door such that with the door in the closed orientation, the second seal contacts areas of the surfaces that define the door opening such that the second seal is outboard of the first seal. Further, the peripheral surfaces of the door between the first seal and the second seal, the first seal and the second seal defining a space therebetween. The vent member is installed within the vehicle body structure compressing a section of the first seal such that the vent member and an adjacent section of the door define a vent gap therebetween thereby allowing venting of air trapped and compressed within the space during movement of the door to the closed orientation.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
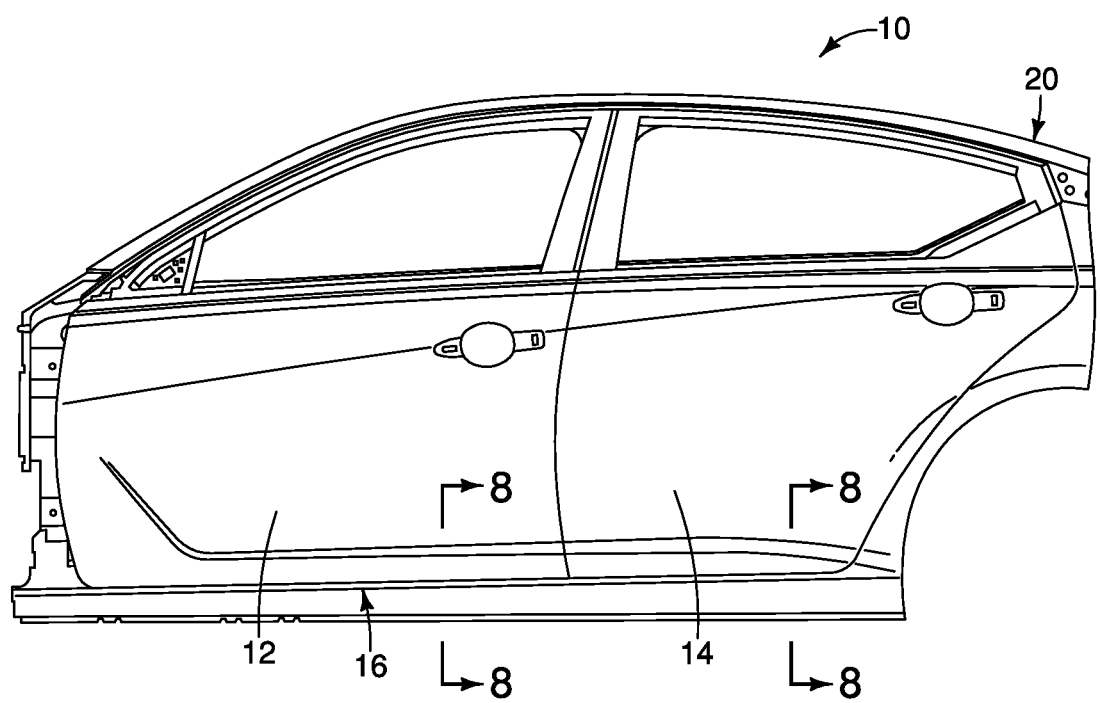
FIG. 1 is an outboard side view of a portion of a vehicle including a vehicle body structure that defines front and rear door openings, a front door and a rear door in accordance with the various embodiments.

Referring initially to FIG. 1, a vehicle body structure 10 supporting a front door 12 and a rear door 14 is illustrated in accordance with a first embodiment. The vehicle body structure 10, the front door 12 and a rear door 14 define vehicle door seal assemblies 16 that are described in greater detail below.

Figure 2:
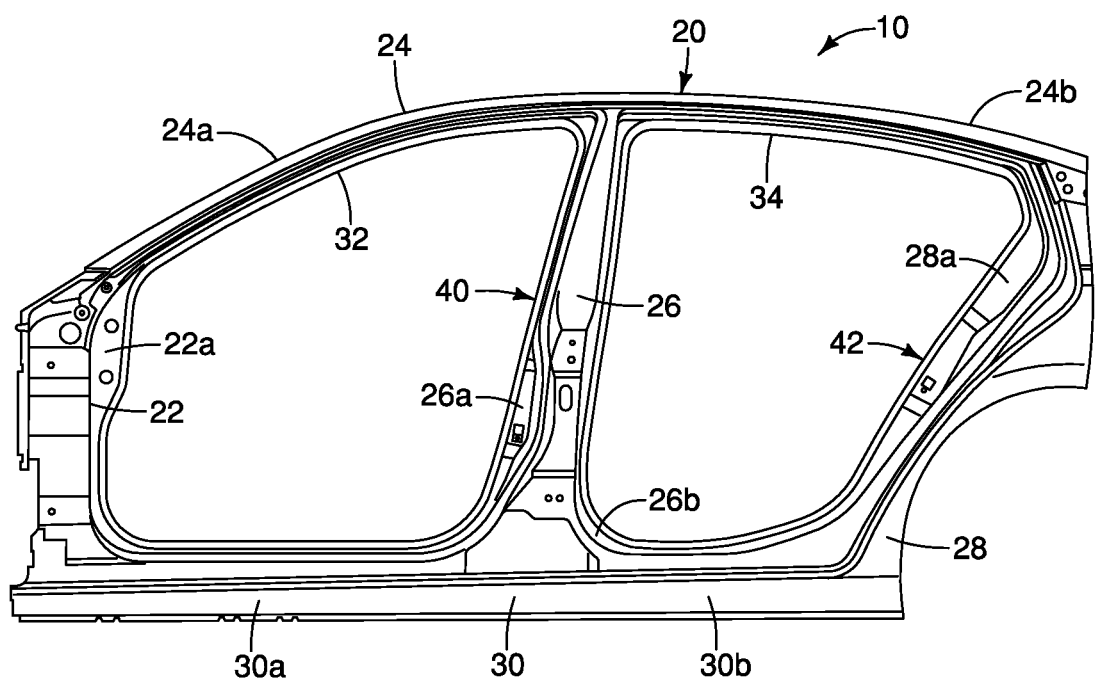
FIG. 2 is an outboard side view of the vehicle body structure with the doors removed showing a door opening seal installed to a front door opening and a rear opening seal installed to the rear door opening in accordance with the various embodiments.

As shown in FIG. 2, the vehicle body structure 10 includes a side assembly 20. The side assembly 20 includes an A-pillar 22, a roof side rail 24, a B-pillar 26, a C-pillar 28 and a sill structure 30. The side assembly 20 further defines a front door opening 32 and a rear door opening 34. More specifically, the front door opening 32 is defined by the A-pillar 22, a forward section 24a of the roof side rail 24, the B-pillar 26 and a forward portion of the sill structure 30. Further, the rear door opening 34 is defined by the B-pillar 26, a rearward section 24b of the roof side rail 24, the C-pillar 28 and a rearward portion 30b of the sill structure 30.

The front door 12 (and the rear door 14) are attached to the vehicle body structure 10 for pivotal movement between a closed orientation (shown in FIG. 1) covering the corresponding door opening 32 or 34 and an open orientation (not shown) exposing the door opening 32 or 34.

FIG. 1 shows the front door 12 installed to the A-pillar 22 of the vehicle body structure 10 at a forward end of the front door opening 22. As well, the rear door 14 is installed to the B-pillar 26 of the vehicle body structure 10 at a forward end of the rear door opening 34.

As shown in FIG. 2 with the doors 12 and 14 removed, a front opening seal 40 (a first seal) is installed to the side assembly 20 such that the front opening seal 40 completely encircles or surrounds the front door opening 32. Specifically, a portion of the front opening seal 40 extends along a surface 22a of the A-pillar 22, a surface of the forward portion 24a of the roof side rail 24, a forward surface 26b of the B-pillar 26 and a surface of the forward section 30a of the sill structure 30.

As is also shown in FIG. 2, a rear opening seal 42 (another first seal) is installed to the side assembly 20 such that the rear opening seal 42 completely encircles or surrounds the rear door opening 34. Specifically, a portion of the rear opening seal 42 extends along a surface 26b of the B-pillar 26, a surface of the rearward portion 24b of the roof side rail 24, a forward surface 28a of the C-pillar 28 and a surface of the forward section 30a of the sill structure 30.

Figure 3:
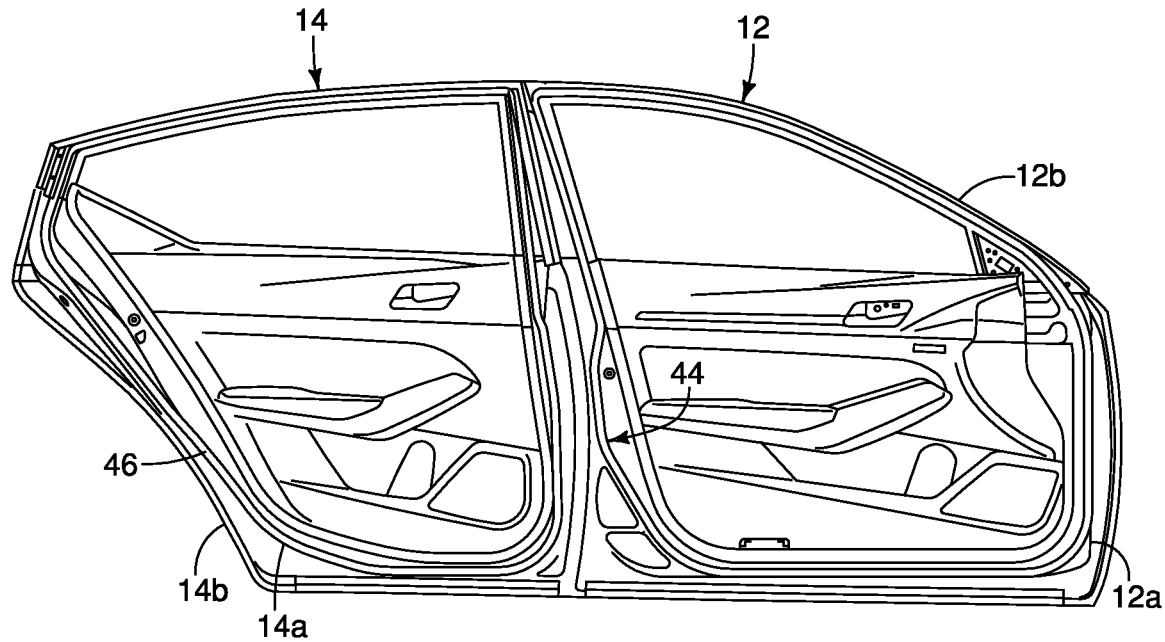
FIG. 3 is an inboard side view of the doors shown removed from the vehicle, the front door having a door seal installed thereto and the rear door having a door seal installed thereto, the door seals being installed to outer peripheral surfaces of respective ones of the front and rear doors in accordance with the various embodiments.

As shown in FIG. 3, with the doors 12 and 14 removed from the side assembly 20 of the vehicle body structure 10, a front door seal 44 (a second seal) is installed to an interior side of the front door 12. Specifically, a portion of the front door seal 44 extends along an inboard facing peripheral surface 12a of the front door 12. Put another way, the front door seal 44 extends adjacent to edges 12b of the front door 12.

Also shown in FIG. 3, a rear door seal 46 (another second seal) is installed to an interior side of the rear door 14. Specifically, a portion of the rear door seal 46 extends along an inboard facing peripheral surface 14a of the rear door 14. Put another way, the rear door seal 46 extends adjacent to edges 14b of the rear door 14.

Figure 4:
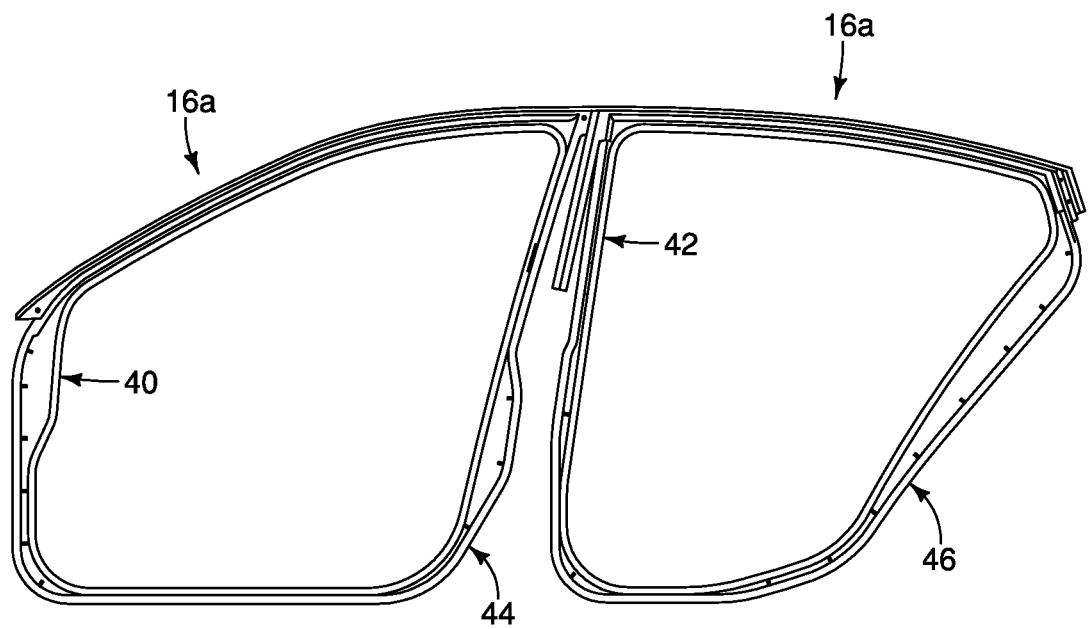
FIG. 4 is an outboard side view of the door opening seals and the door seals removed from the vehicle show in their respective installed states and installed shapes in accordance with the various embodiments.

FIG. 4 shows the front opening seal 40 and the front door seal 44 removed from the vehicle body structure 10 and front door 12. In FIG. 4, the front opening seal 40 and the front door seal 44 are shown in positions relative to one another with the front door 12 in a closed orientation. FIG. 4 shows the rear opening seal 42 and the rear door seal 46 removed from the vehicle body structure 10 and rear door 14. The rear opening seal 42 and the rear door seal 46 are shown in positions relative to one another with the front door 12 in a closed orientation.

The relationship between the front opening seal 40 (the first seal) and the front door seal 44 (the second seal) is such that the front door seal 44 is outboard of the front opening seal 40. Further, the front door seal 44 encircles the front opening seal 40 and hence completes surrounded by the front opening seal 40, at least as shown in the side view in FIG. 4. In other words, the front door seal 44 is larger than the front opening seal 40.

Although not shown in FIG. 4, upper portions of the front door seal 44 can be adjacent to and even contact the front opening seal 42. However, along the sill structure 30, the front door seal 44 and the front opening seal 40 are spaced apart from one another defining an enclosed space 50a, as is more apparent in cross-sectional views described below.

The relationship between the rear opening seal 42 (another first seal) and the rear door seal 46 (another second seal) is such that the rear door seal 46 is outboard of the rear opening seal 42. Further, the rear door seal 46 encircles the rear opening seal 42. In other words, the rear opening seal 42 is completely surrounded by the rear door seal 46, at least as shown in the side view in FIG. 4.

Although not shown in FIG. 4, upper portions of the rear door seal 46 can be adjacent to and contact the rear opening seal 42. However, along the sill structure 30, the rear door seal 46 and the rear opening seal 42 are spaced apart from one another creating an enclosed space 50b, as is more apparent in cross-sectional views described in greater detail below.

There are two vehicle door seal assemblies 16a and 16b, each can also be referred to as the seal assembly 16. The seal assembly 16a is defined by the front opening seal 40, the front door seal 44 and the surfaces of the side assembly 20 therebetween. The surfaces of the side assembly 20 therebetween include the portion of surface 22a of the A-pillar 22 between the front opening seal 40 and the rear opening seal 42, the surface of the forward portion 24a of the roof side rail 24 between the front opening seal 40 and the front door seal 44, the forward surface 26b of the B-pillar 26 between the front opening seal 40 and the front door seal 44 and the surface of the forward section 30a of the sill structure 30 between the front opening seal 40 and the rear opening seal 42.

The seal assembly 16b is similarly defined by the rear opening seal 42, the rear opening seal 46 and the surfaces of the side assembly 20 therebetween. The surfaces of the side assembly 20 therebetween include the portion of rearward surface of the B-pillar 26 between the area opening seal 42 and the rear door seal 46, the surface of the rearward portion 24b of the roof side rail 24 between the front opening seal 40 and the rear opening seal 42, the forward surface of the C-pillar 28 between the front opening seal 40 and the rear opening seal 42 and the surface of the rearward section 30b of the sill structure 30 between the rear opening seal 42 and the rear door seal 46.

Figure 8:
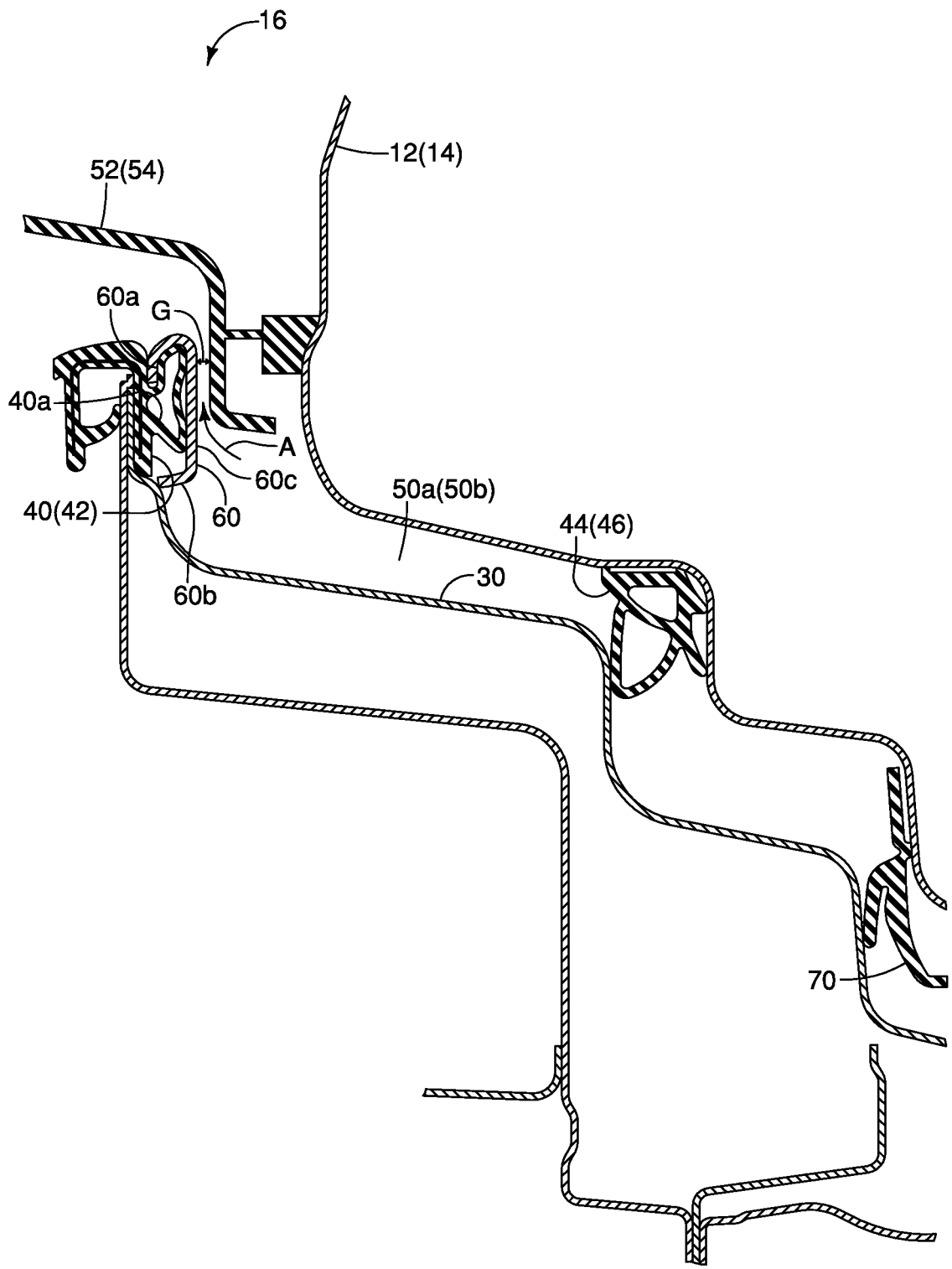
FIG. 8 is a cross-sectional view of the door sill area of the vehicle body structure and door taken along the two lines 8-8 in FIG. 1, showing the door opening seal, the door seal and the vent member fitted to the door opening seal in accordance with a first embodiment.

The seal assembly 16a and seal assembly 16b have differing shapes, they both have the same purpose and same shortcomings. Specifically, as shown in FIG. 8, the seal assembly 16a encloses the space 50a defined by the front opening seal 40, the front door seal 44 and the surfaces of the side assembly 20 therebetween. Similarly, as is also shown in FIG. 8, the seal assembly 16b encloses the space 50b defined by the rear opening seal 42, the rear door seal 46 and the surfaces of the side assembly 20 therebetween.

As the front door 12 or the rear door 14 is closed, air pressure increases within the spaces 50a and 50b. This often makes closing the doors 12 and 14 difficult as the compressed air creates a force against movement of the doors 12 and 14 to the closed orientation.

Figure 5:
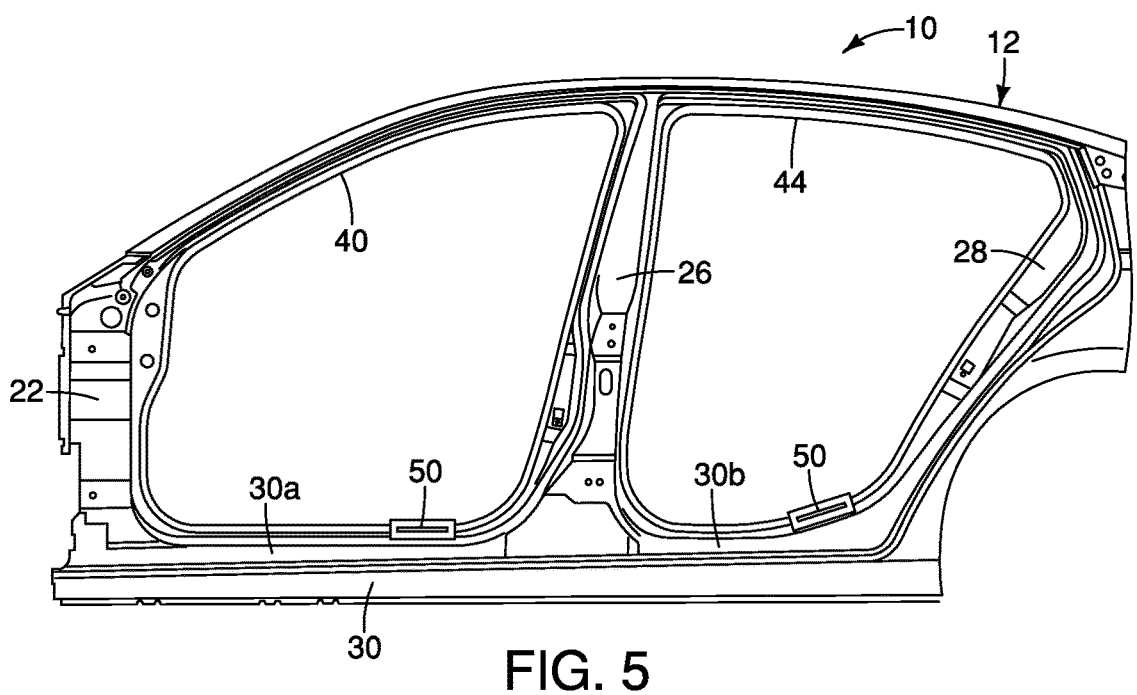
FIG. 5 is another outboard side view of the vehicle body structure with the doors removed showing a vent member fitted to a sill portion of the door opening seal installed to the front door opening and another vent member installed to a sill portion of the door opening seal installed to the rear door opening in accordance with the various embodiments.
Figure 6:
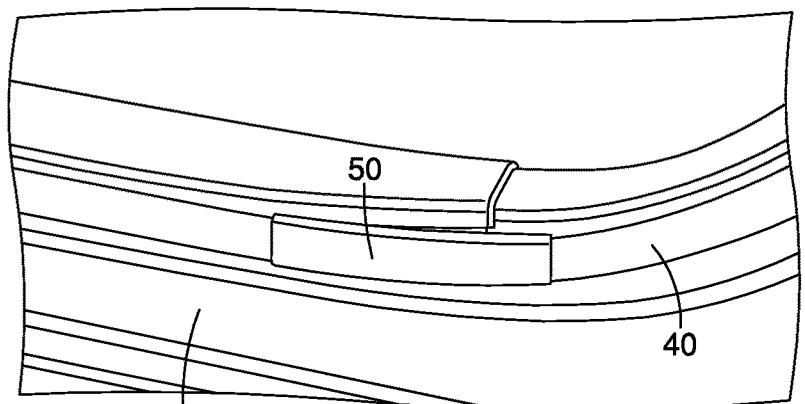
FIG. 6 is a perspective view of a portion of the vehicle body structure showing the vent member fitted to the sill portion of the door opening seal installed to the front door opening in accordance with the various embodiments.
Figure 7:
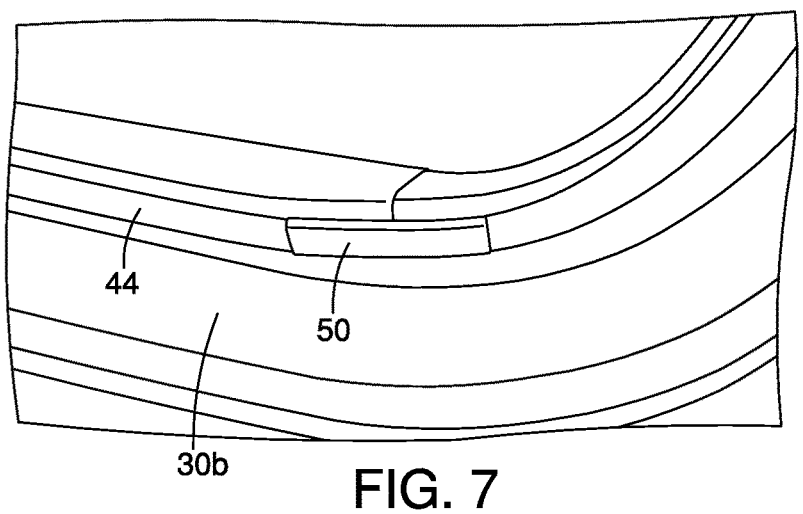
FIG. 7 is a perspective view of a portion of the vehicle body structure showing the vent member fitted to the sill portion of the door opening seal that is installed to the rear door opening in accordance with the various embodiments.

Separate vent members 60 are installed to a small section of the front opening seal 40 and a small portion of the rear opening seal 42, as shown in FIGS. 5-8. One vent member 60 is installed to the front opening seal 40 (FIGS. 5, 6 and 8) and another vent member 60 is installed to the rear opening seal 44 (FIGS. 5, 7 and 8). Since the sill structures 30a and 30b of the sill structure 30 are similar, and possibly the same, the embodiments shown in FIGS. 8-13 represent both front and rear seal assemblies 16a and 16b, for the sake of brevity.

Figure 9:
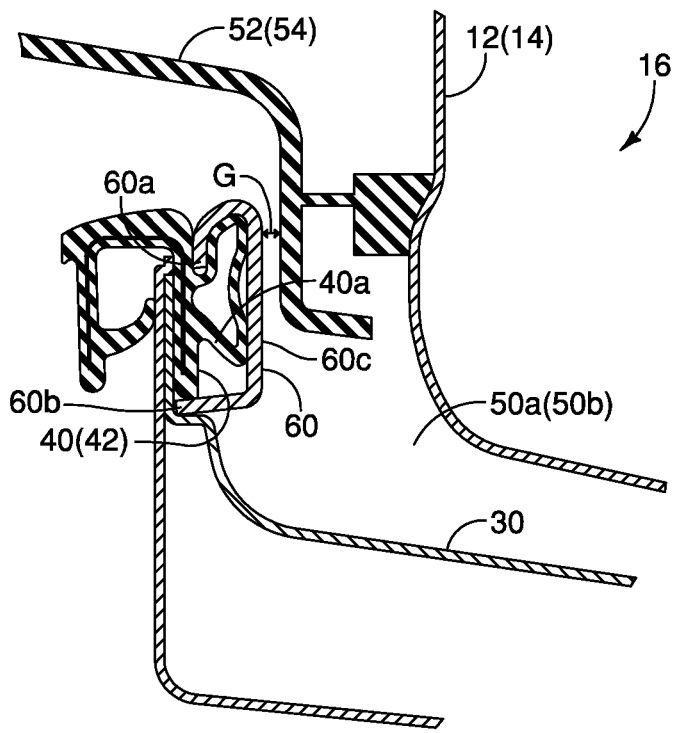
FIG. 9 is another cross-sectional view of the door sill area of the vehicle body structure and door of FIG. 8 showing the door opening seal, the door seal and the vent member fitted to the door opening seal in accordance with the first embodiment.

More specifically as shown in cross-section in FIGS. 8 and 9, a first embodiment of the vent member 60 is shown fitted around or installed to the first seal 40 (or the first seal 42). The structures of the vehicle body structure 10 that define the front door opening 32 and the rear door opening 34 are very similar. In particular, the sill structure 30 (the forward section 30a of the front door opening 32 and the rearward section 30b of the rear door opening 34 are functionally identical in the areas of the two cross-sectional view lines 8-8 in FIG. 1. In other words, the forward section 30a of the sill structure 30 and the rearward section 30b of the sill structure 30 similar enough that they can be represented in the same drawing, FIG. 8. Minor differences in the forward section 30a and the rearward section 30b are insignificant with respect to understanding the purpose and function of the vent member 60 as used on the first seals 40 and 42. Therefore, in the following description, for the sake of brevity, description of the first seal 40 applies equally to the first seal 42, description of the second seal 44 applies equally to the second seal 46. Further description of the front door 12 applies equally to the rear door 14. Description of the enclosed space 50a applies equally to the enclosed space 50b.

As shown in FIG. 8, the door seal assembly 16 can optionally include a lower water/debris blocking seal 70 that extends below the first seal 40 and below the second seal 44. The seal 70 is typically only provided at the bottom of the door 12.

As shown in FIGS. 8 and 9, the door seal assembly 16 includes the first seal 40 installed on to a vertical seam of two joined panels of the sill structure 30 and the second seal 44 installed to the vehicle door 12. The vehicle door 12 includes a trim panel 52 (the door 14 includes a trim panel 54) that is fixed to an inner door panel of the door 12. With the door 12 in the closed orientation, as shown in FIGS. 8 and 9, the second seal 44 is compressed between the door 12 and the sill structure 30. In the absence of the vent member 60, the first seal 40 is compressed against the adjacent surface of the trim panel 52 of the door 12.

With the vent member 60 installed to the first seal 40, an outboard portion 40a of the first seal 40 is compressed such that it and the vent member 60 are spaced apart from the adjacent surface of the trim panel 52 of the door 12, as shown in FIGS. 8 and 9. Consequently, a vent gap G is defined between the trim panel 52 and the first seal 40 that allows air A to escape from the space 50a as the door 12 moved to the closed position. Consequently, the air A within the space 50a is not compressed and does not make it more difficult to close the door 12.

The vent member 60 wraps partway around the first seal 40 compressing the section of the first seal 40 confined and compressed by the vent member 60 thereby preventing that section of the first seal 40 from contacting the adjacent section trim section 52 of the front door 12.

The vent member 60 has a C-shape that wraps around the outboard portion 40a of the first seal 40. The C-shaped of the vent member 60 is such that a downwardly extending upper lip 60a of the vent member 60 is positioned within a recess defined by the first seal 40 with the vent member 60 installed on the first seal 40. A lower end 60b of the vent member 40 extends in an inboard direction with the distal end thereof contacting a portion of the sill structure 30 and being located along a bottom edge the first seal 40. The vent member 60 includes a flat surface 60c that extends from the downwardly extending upper lip 60a to the lower end 60b of the vent portion 60. The flat surface 60c is spaced apart from an adjacent section of the door 12 with the door 12 in the closed orientation thereby defining the vent gap G.

Second Embodiment

Figure 10:
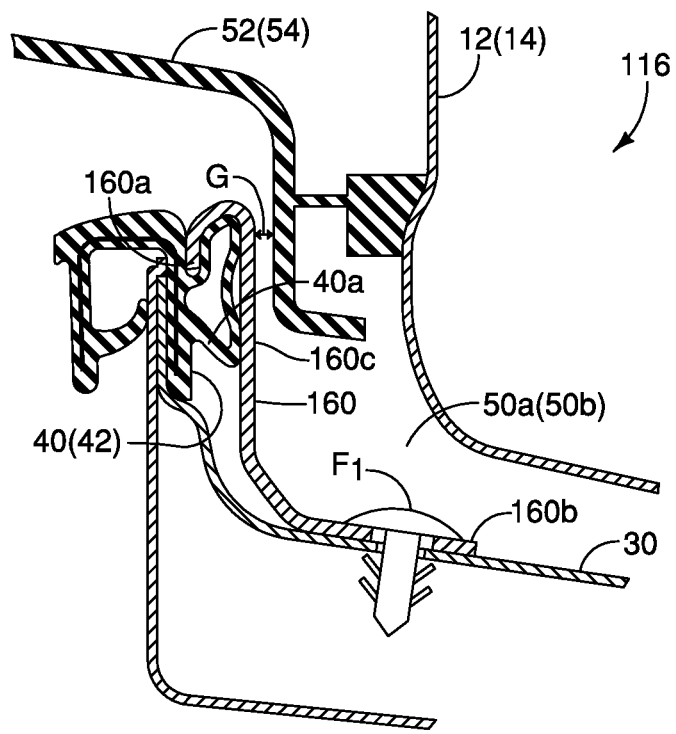
FIG. 10 is a cross-sectional view of the door sill area of the vehicle body structure and door showing a door opening seal, the door seal and the vent member fitted to the door opening seal in accordance with a second embodiment.

Referring now to FIG. 10, a door seal assembly 116 with a vent member 160 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The second embodiment includes the door 12, the sill structure 30, the first seal 40 and the second seal 44, as described above with respect to the first embodiment shown in FIGS. 8 and 9.

In the second embodiment, the vent member 160 has a downwardly extending upper lip 160a, a lower flange 160b and a flat surface 160c. The upper lip 160a extends downward into the recess defined by the first seal 40 with the vent member 160 installed on the first seal 40. The flat surface 160c extends between an upper portion of the vent member 160 to the lower flange 160b. The lower flange 160b extends in an outboard direction along a portion of the sill structure 30 and is attached to the sill structure 30 via a fastener F1. The vent gap G is defined between the flat surface 160c and the adjacent surface of the trim panel 52 of the first door 12.

Third Embodiment

Figure 11:
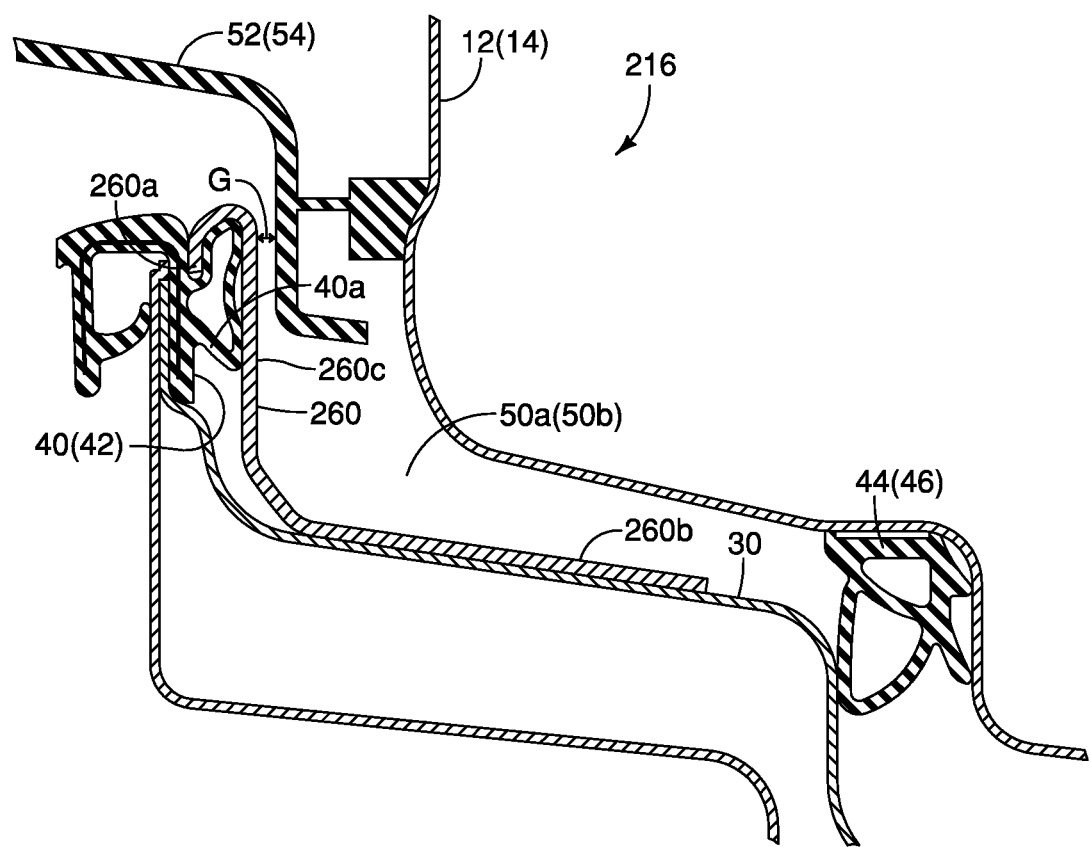
FIG. 11 is a cross-sectional view of the door sill area of the vehicle body structure and door showing a door opening seal, the door seal and the vent member fitted to the door opening seal in accordance with a third embodiment.

Referring now to FIG. 11, a door seal assembly 216 with a vent member 260 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The third embodiment includes the door 12, the sill structure 30, the first seal 40 and the second seal 44, as described above with respect to the first embodiment shown in FIGS. 8 and 9.

In the third embodiment, the vent member 260 has a downwardly extending upper lip 260a, a lower flange 260b and a flat surface 260c. The upper lip 260a extends downward into the recess defined by the first seal 40 with the vent member 260 installed on the first seal 40. The flat surface 260c extends downward between an upper portion of the vent member 260 to the lower flange 260b. The lower flange 260b extends in an outboard direction along a portion of the sill structure 30 and is attached to the sill structure 30 by an adhesive, mastic or other bonding agent. The vent gap G is defined between the flat surface 260c and the adjacent surface of the trim panel 52 of the first door 12.

Fourth Embodiment

Figure 12:
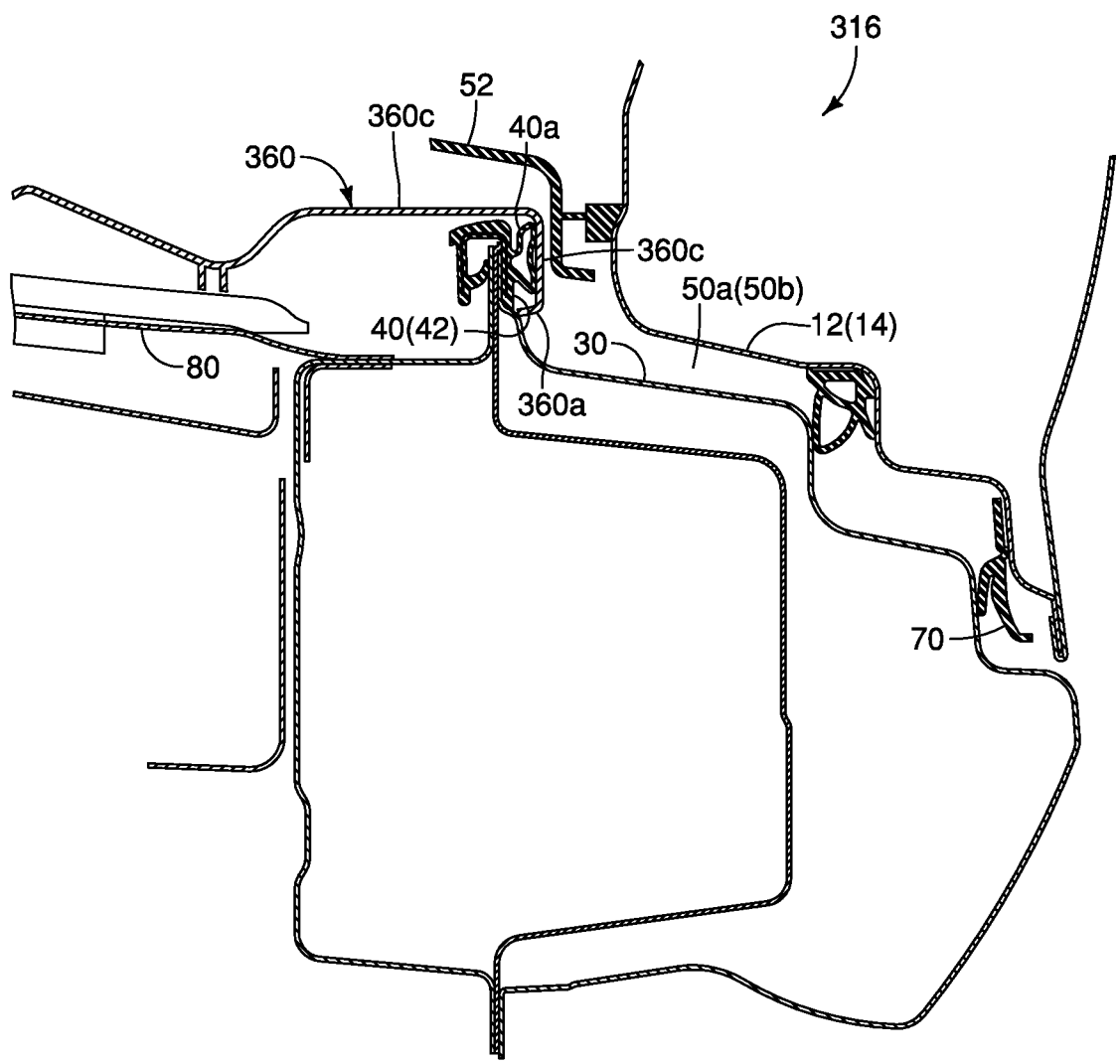
FIG. 12 is a cross-sectional view of the door sill area of the vehicle body structure and door showing a door opening seal, the door seal and the vent member fitted to the door opening seal in accordance with a fourth embodiment.

Referring now to FIG. 12, a door seal assembly 316 with a vent member 360 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The fourth embodiment includes the door 12, the sill structure 30, the first seal 40 and the second seal 44, as described above with respect to the first embodiment shown in FIGS. 8 and 9.

In the fourth embodiment, the vent member 360 has a lower lip 360a, a upper flange 360b and a flat surface 360c. The lower lip 360a extends in an inboard direction beneath the first seal 40. The flat surface 360c extends upward from the lower lip 360a to the upper flange 360b. The upper flange 360b extends in an inboard direction along a portion of a floor 80 of the vehicle body structure 10 and is attached to the floor 80 by an adhesive, mastic, other bonding agent or mechanical fastener (not shown). The vent gap G is defined between the flat surface 360c and the adjacent surface of the trim panel 52 of the first door 12.

Fifth Embodiment

Figure 13:
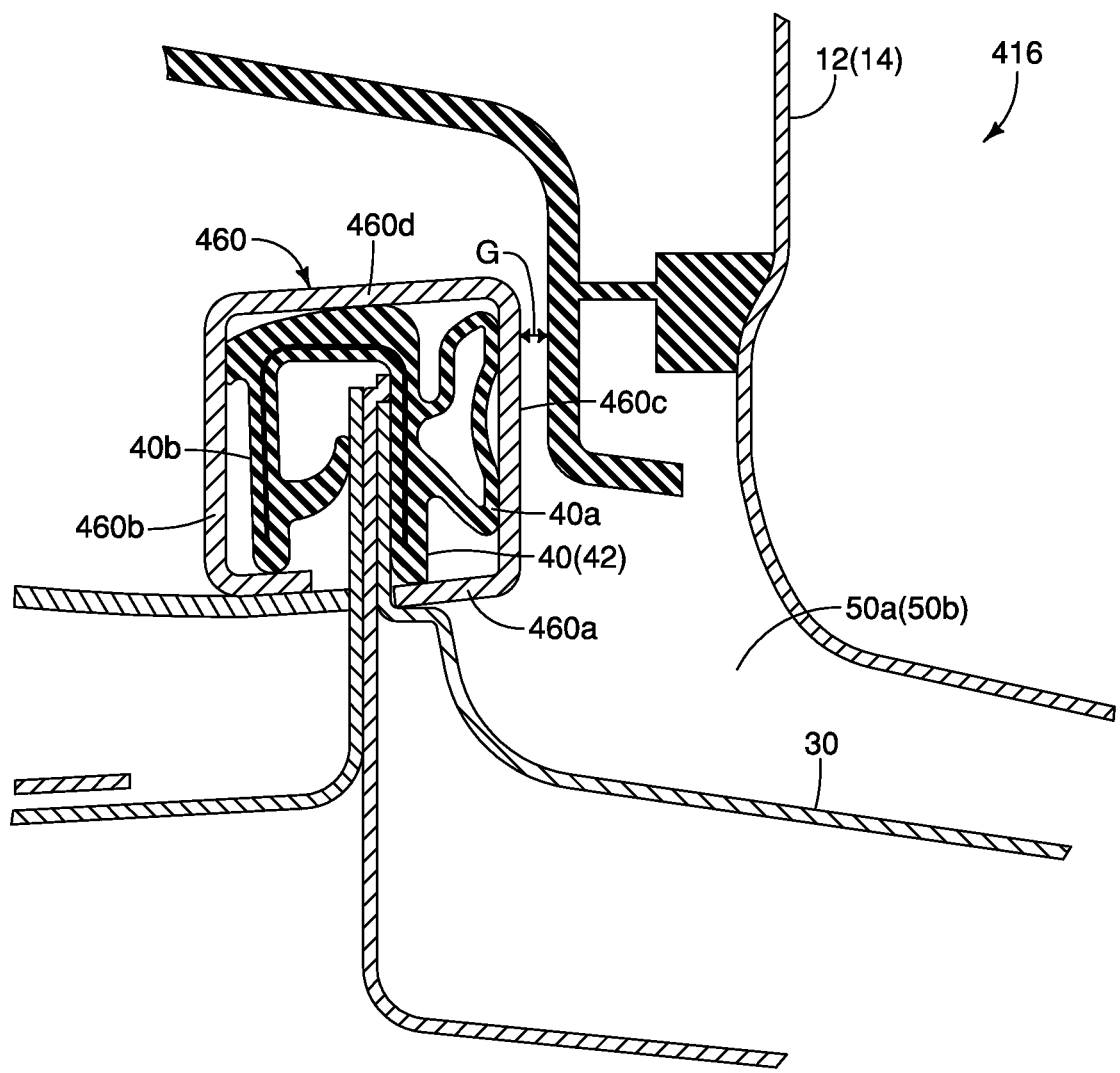
FIG. 13 is a cross-sectional view of the door sill area of the vehicle body structure and door showing a door opening seal, the door seal and the vent member fitted to the door opening seal in accordance with a fifth embodiment.

Referring now to FIG. 13, a door seal assembly 416 with a vent member 460 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The fifth embodiment includes the door 12, the sill structure 30, the first seal 40 and the second seal 44 (not shown in FIG. 13), as described above with respect to the first embodiment shown in FIGS. 8 and 9.

In the fifth embodiment, the vent member 460 has an outboard lower lip 460a, an inboard lower flange 460b, a flat surface 460c and an upper flat section 460d. The outboard lower lip 460a extends beneath the outboard portion 40a of the seal 40, the flat surface 460c extends upward from the lower lip 460a, the inboard lower flange 460b extends under an inboard portion 40b and the upper flat section 460d extends from an upper end of the inboard lower flange 460b to the upper end of the lower lip 460a.

The vent member 460 resembles an inverted U-shape surrounding three sides of the seal 40 and partially covering the fourth (lower) side of the seal 40.

In each of the above embodiments, a small portion of the first seal 40 is compressed creating a gap G that defines an air vent to relieve air pressure within the otherwise confined space 50a. The relief of air pressure within the space 50a makes closing the door 12 easier since air pressure within the space 50a is not increased as the door 12 is closed.

The various portions of the vehicle body structure, other than the seals and the vent member, are conventional components that are well known in the art. Since these portions of the vehicle body structure are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the door seal assembly. Accordingly, these terms, as utilized to describe the present invention should be interpreted relative to a vehicle equipped with the door seal assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A vehicle door seal assembly, comprising
a vehicle body structure with surfaces that define a door opening;
a first seal attached to inboard areas of the surfaces such that the first seal surrounds the door opening;
a door attached to the vehicle body structure for pivotal movement between a closed orientation covering the door opening and an open orientation exposing the door opening, the door having peripheral surfaces that surround the door and a trim panel fixed thereto that moves with the door between the closed orientation and the open orientation;

a second seal attached to areas of the peripheral surfaces of the door such that with the door in the closed orientation, the second seal contacts areas of the surfaces that define the door opening such that the second seal is outboard of the first seal, the peripheral surfaces of the door between the first seal and the second seal, the first seal and the second seal defining a space therebetween; and a vent member installed within the vehicle body structure compressing a section of the first seal such that the vent member and an adjacent section of the door define a vent gap between the first seal and the trim panel thereby allowing venting of air trapped and compressed within the space during movement of the door to the closed orientation.

2. The vehicle door seal assembly according to claim 1, wherein
the second seal surrounds the first seal as viewed from an outboard side of the vehicle.

3. The vehicle door seal assembly according to claim 1, wherein
the vent member is a C-shaped member that wraps around a portion of the first seal.

4. The vehicle door seal assembly according to claim 1, wherein
the vehicle body structure includes a sill structure, and
the vent member contacts a portion of the sill structure.

5. The vehicle door seal assembly according to claim 1, wherein
the vehicle body structure includes a sill structure, and
the first seal is located on a vertical seam of two joined panels of the sill structure.

6. The vehicle door seal assembly according to claim 1, wherein
the vent member compresses an outboard portion of the first seal.

7. The vehicle door seal assembly according to claim 1, wherein
the vent member wraps partway around the first seal.

8. The vehicle door seal assembly according to claim 1, wherein
the vent member prevents a section of the first seal from contacting an adjacent section of the trim panel.

9. A vehicle door seal assembly, comprising:
a vehicle body structure with surfaces that define a door opening;
a first seal attached to inboard areas of the surfaces such that the first seal surrounds the door opening;
a door attached to the vehicle body structure for pivotal movement between a closed orientation covering the door opening and an open orientation exposing the door opening, the door having peripheral surfaces that surround the door;
a second seal attached to areas of the peripheral surfaces of the door such that with the door in the closed orientation, the second seal contacts areas of the surfaces that define the door opening such that the second seal is outboard of the first seal, the peripheral surfaces of the door between the first seal and the second seal, the first seal and the second seal defining a space therebetween; and
a vent member installed within the vehicle body structure compressing a section of the first seal such that the vent member and an adjacent section of the door define a vent gap therebetween thereby allowing venting of air trapped and compressed within the space during movement of the door to the closed orientation, the vent member including a C-shaped member that wraps around a portion of the first seal such that a downwardly extending upper lip of the vent member is positioned within a recess defined by the first seal with the vent member installed on the first seal.

10. The vehicle door seal assembly according to claim 9, wherein
the C-shaped member of the vent member is such that a lower end of the vent member extends in an inboard direction with a distal end thereof being located along a bottom edge the first seal.

11. The vehicle door seal assembly according to claim 10, wherein
the vent member includes a flat surface that extends from the downwardly extending upper lip to the distal end of the vent member, the flat surface being spaced apart from an adjacent section of the door with the door in the closed orientation thereby defining the vent gap.

12. A vehicle door seal assembly, comprising:
a vehicle body structure with surfaces that define a door opening:
a first seal attached to inboard areas of the surfaces such that the first seal surrounds the door opening:
a door attached to the vehicle body structure for pivotal movement between a closed orientation covering the door opening and an open orientation exposing the door opening, the door having peripheral surfaces that surround the door;
a second seal attached to areas of the peripheral surfaces of the door such that with the door in the closed orientation, the second seal contacts areas of the surfaces that define the door opening such that the second seal is outboard of the first seal, the peripheral surfaces of the door between the first seal and the second seal, the first seal and the second seal defining a space therebetween; and
a vent member installed within the vehicle body structure compressing a section of the first seal such that the vent member and an adjacent section of the door define a vent gap therebetween thereby allowing venting of air trapped and compressed within the space during movement of the door to the closed orientation, the vent member including a downwardly extending upper lip that is positioned within a recess defined by the first seal with the vent member installed on the first seal.

13. The vehicle door seal assembly according to claim 12, wherein
the vent member has a lower flange that extends in an outboard direction.

14. The vehicle door seal assembly according to claim 13, wherein
the vent member includes a flat surface that extends from the downwardly extending upper lip to the lower flange, the flat surface being spaced apart from an adjacent section of the door with the door in the closed orientation thereby defining the vent gap.

15. The vehicle door seal assembly according to claim 13, wherein the lower flange is fixed to a sill portion of the surfaces that define the door opening.

16. A vehicle door seal assembly, comprising:
a vehicle body structure with surfaces that define a door opening;
a first seal attached to inboard areas of the surfaces such that the first seal surrounds the door opening;
a door attached to the vehicle body structure for pivotal movement between a closed orientation covering the door opening and an open orientation exposing the door opening, the door having peripheral surfaces that surround the door;

a second seal attached to areas of the peripheral surfaces of the door such that with the door in the closed orientation, the second seal contacts areas of the surfaces that define the door opening such that the second seal is outboard of the first seal, the peripheral surfaces of the door between the first seal and the second seal, the first seal and the second seal defining a space therebetween; and a vent member installed within the vehicle body structure compressing a section of the first seal such that the vent member and an adjacent section of the door define a vent gap therebetween thereby allowing venting of air trapped and compressed within the space during movement of the door to the closed orientation, the vent member including a lower flange that extends in an inboard direction beneath and adjacent to the first seal.

17. The vehicle door seal assembly according to claim 16, wherein the vent member includes an upper flange that extends in an inboard direction above and extending over the first seal.

18. The vehicle door seal assembly according to claim 17, wherein the vent member includes a flat surface that extends from the lower flange to the upper flange, the flat surface being spaced apart from an adjacent section of the door with the door in the closed orientation thereby defining the vent gap.

19. The vehicle door seal assembly according to claim 16, wherein the vent member includes an upper flange and an inboard flange that extends downward from the upper flange, the inboard flange including a lower lip that extends in an outboard direction beneath an inboard section of the first seal.

20. The vehicle door seal assembly according to claim 19, wherein the vent member includes a flat surface that extends from the lower flange to the upper flange, the flat surface being spaced apart from an adjacent section of the door with the door in the closed orientation thereby defining the vent gap.

* * * * *